Sept. 23, 1969   R. C. SANFORD   3,468,344
SINGLE CONTROL DUAL FLOW VALVE
Filed June 16, 1966   3 Sheets-Sheet 1

INVENTOR
ROSS C. SANFORD,
BY Yungblut, Melville, Strasser and Foster
ATTORNEYS

Sept. 23, 1969  R. C. SANFORD  3,468,344
SINGLE CONTROL DUAL FLOW VALVE
Filed June 16, 1966  3 Sheets-Sheet 2
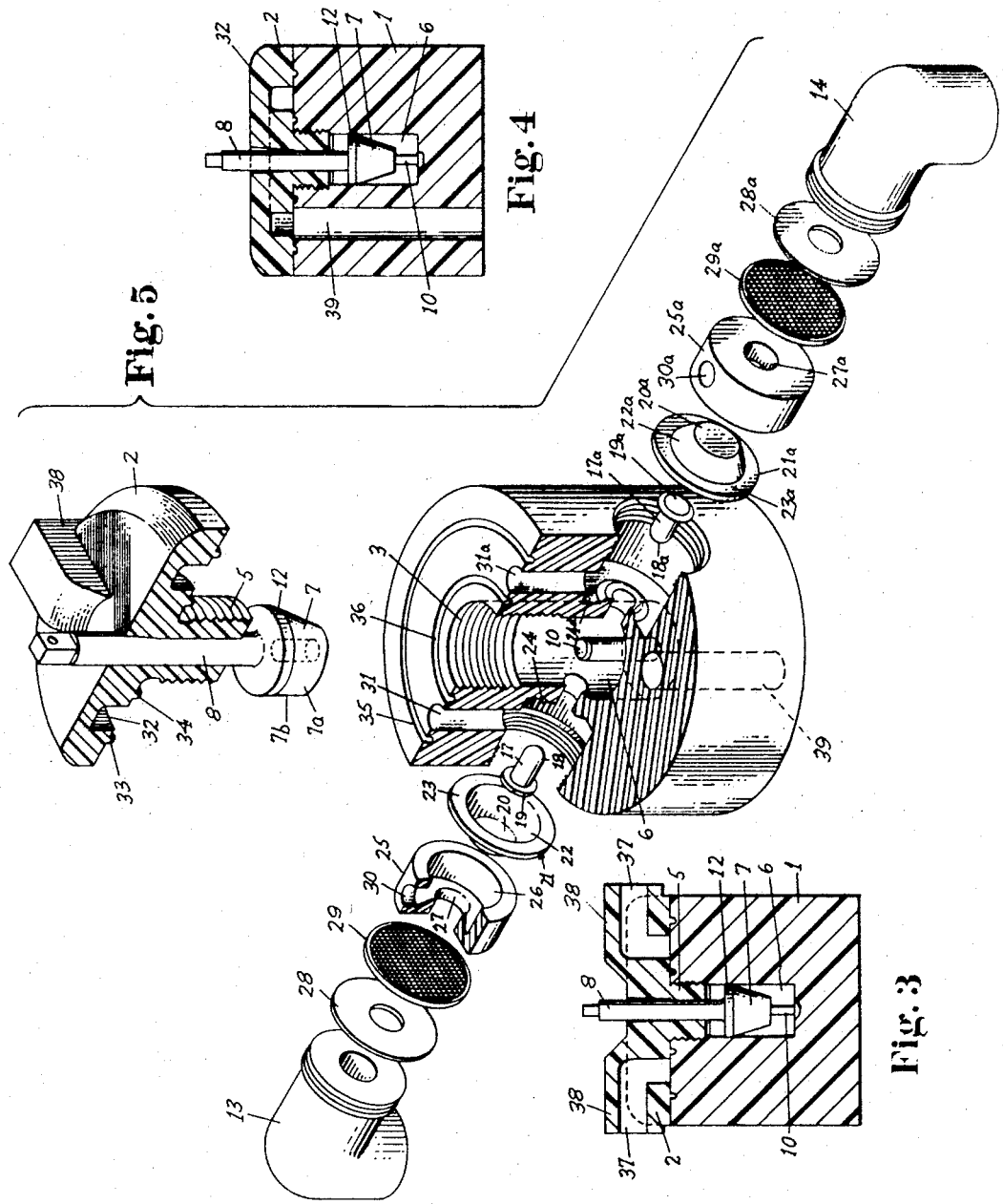
INVENTOR
ROSS C. SANFORD,
BY Yungblut, Melville, Strasser and Foster
ATTORNEYS Sept. 23, 1969  R. C. SANFORD  3,468,344
SINGLE CONTROL DUAL FLOW VALVE
Filed June 16, 1966  3 Sheets-Sheet 3

INVENTOR
ROSS C SANFORD,
BY Yungblut, Melville, Strasser and Foster
ATTORNEYS

United States Patent Office 3,468,344
Patented Sept. 23, 1969

3,468,344
SINGLE CONTROL DUAL FLOW VALVE
Ross C. Sanford, 102 Cleveland Ave.,
Milford, Ohio 45150
Filed June 16, 1966, Ser. No. 558,060
Int. Cl. F16k 7/06, 19/00
U.S. Cl. 137—636.4                     9 Claims

ABSTRACT OF THE DISCLOSURE

The valve structure particularly suited for water faucets which is of simple and inexpensive construction and is devoid of springs and packing glands, the flow of water through the valve being controlled by a displaceable diaphragm movable by a cam actuated plunger to a closed position in which it seals the inlet passageway of the valve, the diaphragm being movable to an open position by water pressure in the inlet passageway upon movement of the cam to release the plunger for inward movement, the diaphragm also serving to seal the cam and the plunger from contact by water flowing through the valve, the construction being particularly adapted for use in a single control dual flow valve wherein the flow of both hot and cold water is controlled using a single cam to control an opposing pair of plungers and coacting diaphragms.

---

This invention relates to valves and has to do more particularly with a valve for use in conjunction with faucets to control the flow of hot and cold water therethrough.

In most modern home installations the supply of hot and cold water is dispensed through a single faucet or spout, the hot and cold water being supplied to the spout either through separate valves or through a single valve element which permits the user to selectively determine the quantity of hot or cold water being dispensed at any given time. The present invention relates specifically to a single control dual flow valve by means of which either hot or cold water may be dispensed or admixed in any desired proportion utilizing a single control mechanism which may be of the single lever or push-pull type.

While single control dual flow valves have hitherto been proposed, they have been of relatively complicated construction involving numerous parts which are both expensive to manufacture and difficult to assemble. Such valves have presented corrosion problems and the build-up of mineral deposits which adversely affect their proper operation, and they have been subject to objectionable leakage due to the presence of packing glands and the like which are subject to wear and deterioration.

In contrast to the foregoing, the instant invention contemplates the provision of a valve mechanism which is extremely simple in design and at the same time provides a dry mechanism in the sense that water flowing through the valve does not come in contact with any of the moving parts.

Accordingly, a principal object of the instant invention is the provision of a single control dual flow valve of simple and inexpensive construction which is readily adapted to various supply line connections, the same valve assembly being capable of being used not only for kitchen and lavatory faucets but also for faucets used in a bath tub or shower, irrespective of whether the valve actuating mechanism is of the lever and ball type, the straight rotating lever type, or of the push-pull type.

A further object of the instant invention is the provision of a valve assembly which is of extremely compact construction and is devoid of packing, O-rings or other similar sealing means.

Still a further object of the instant invention is the provision of a valve assembly which may be constructed from diverse materials, including plastics, thereby avoiding corrosion and mineral build-up effects while at the same time taking advantage of the lubric character of plastics where moving parts are involved.

Still another object of the instant invention is the provision of a single control valve having a single actuating cam which controls the flow of both hot and cold water through the valve, the cam having a compound profile which assures positive shut-off when in the closed position while at the same time affording complete control throughout the full range of operating conditions, i.e., from all hot to all cold, within an operating range of 180°.

Yet another object of the instant invention is the provision of a valve mechanism of the character described which embodies a minimal number of moving parts, namely, a cam and a pair of actuating plungers, while at the same time providing positive opening and closing of the supply lines by means of which the hot and cold water is introduced into the valve. At the same time, the construction of the valve is such that it may incorporate a diverter conduit for supplying water to a spray device of the type used in kitchens to facilitate the rinsing of dishes and the like as they are being washed.

The foregoing, together with other objects of the invention which will appear hereinafter or which will be apparent to the skilled worker in the art upon reading this specification, are accomplished by that construction and arrangement of parts of which an exemplary embodiment shall now be described.

Reference is made to the accompanying drawings wherein:

FIGURE 3 is a vertical sectional view taken along the line 3—3 of FIGURE 2.

FIGURE 4 is a vertical sectional view taken along the line 4—4 of FIGURE 2.

FIGURE 5 is an exploded perspective view of the valve with parts cut away to illustrate its internal construction.

Figure 1:
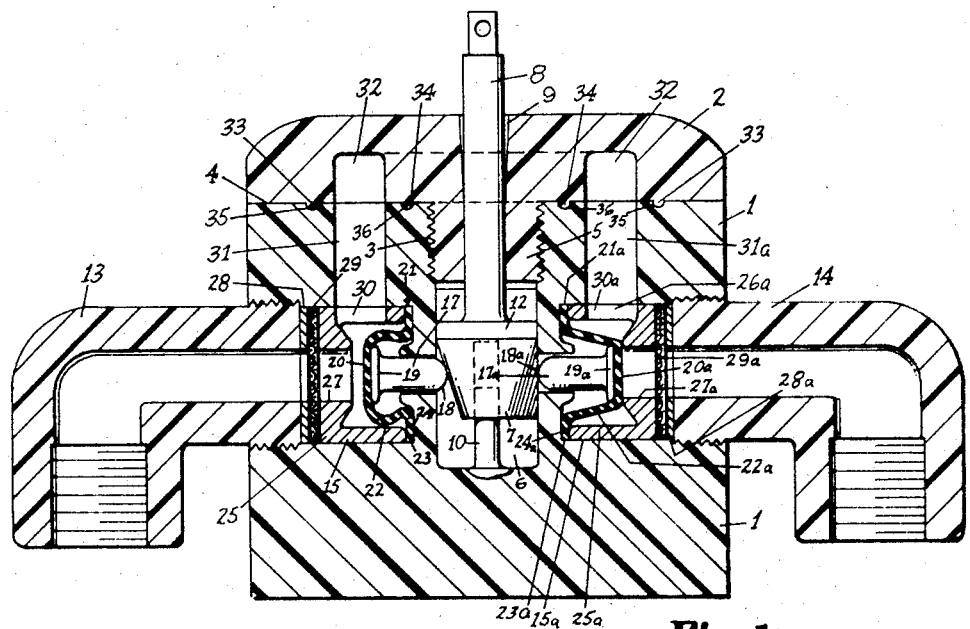
FIGURE 1 is a vertical sectional view of a flow control valve constructed in accordance with the instant invention.

Referring first to FIGURE 1 of the drawing, the valve comprises a body having a bottom part 1 and a top part 2. The bottom part 1 has a centrally disposed threaded bore 3 therein extending downwardly from its upper most surface 4 which is adapted to receive the threaded plug 5 projecting downwardly from the undersurface of top part 2. Thus, when the plug 5 is threaded into the bore 3, the top part 2 will be seated against the upper surface 4 of the bottom part.

A chamber 6 is formed in the bottom part underlying the threaded bore 3, the chamber 6 being of the size to receive the control cam 7 mounted on the lowermost end of cam-shaft 8 which projects upwardly through a central bore 9 in the top part 2. The chamber 6 is of a depth sufficient to permit the control cam 7 to move vertically therein, the cam being guided in its vertical movement by means of a guide post 10 which projects upwardly from the bottom of the chamber and is freely received in the centrally disposed bore 11 projecting upwardly into the body of the cam from its undersurface. While the profile of the control cam 7 will be discussed in greater detail hereinafter, it is competent to note at this juncture that it includes an enlarged body portion 12 which is of cylindrical configuration and has a diameter substantially equal to the diameter of the chamber 6 so that the cam will just nicely fit therein. With such construction, the control cam is rigidly mounted in the sense that it has three spaced apart bearing surfaces, namely, the body portion 12 bearing against the walls of chamber 6, the shaft 8 bearing against the walls of central bore 9, and the cam body 7 riding on guide post 10. Yet the construction does not require close tolerances in order to effect the desired axial and rotational movement of the cam, as will be explained more fully hereinafter.

Water or other fluids are introduced into the bottom part of the valve assembly through fittings 13 and 14 which are of standard construction, the fittings having their innermost ends inserted in the opposing inlet passageways 15 and 15a which extend inwardly from the opposite side of bottom part 1 into the chamber 6. In the embodiment illustrated, the innermost ends of the fittings 13 and 14 are threaded and engage threaded portions of the passageways 15 and 15a, although it will be understood that various other types of connections could be employed.

The innermost portions of the passageways 15 and 15a are of reduced diameter, at 16 and 16a, thereby providing bearing surfaces for the actuating plungers 17 and 17a the innermost ends 18 and 18a of which are rounded for contact with the control cam 7. At their outermost ends the plungers have enlarged heads 19 and 19a adapted to sat against the faces 20 and 20a of diaphragms 21 and 21a which are formed from a flexible resilient material, preferably rubber, such as Buna N. The diaphragms have tapered body portions 22 and 22a terminating in outwardly directed annular flanges 23 and 23a adapted to seat against shoulders 24 and 24a formed in passageways 15 and 15a, respectively.

The annular flanges of the diaphragms are caused to seat against the shoulders 24 and 24a by means of spacers 25 and 25a fitted in the passageways, the spacers having inwardly facing hollow interior portions 26 and 26a of a size to freely receive the diaphragms, the spacers terminating outwardly in centrally disposed valve ports 27 and 27a the diameters of which are somewhat smaller than the diameters of the faces 20 and 20a of the diaphragms and the coacting heads 19 and 19a of the actuating plungers which bear against the inner surfaces of the faces 20 and 20a. In the embodiment illustrated the spacers are pressed inwardly into sealing contact with the flanges of the diaphragms by the fittings 13 and 14, as will be apparent from FIGURE 1, preferably with the interposition of washers 28 and 28a therebetween. It is generally desirable to also provide filter screens 29 and 29a to prevent inert matters from entering the valve. If desired, the washers and screens may be incorporated in an integral structure. It will also be evident that other means may be employed to secure the spacers in place in the passageways 15 and 15a. For example, threaded lock rings could be provided which would engage the threaded outer ends of the passageways 15 and 15a, which lock rings upon being tightened would press the spacers into tight sealing engagement with the diaphragms.

The spacers 25 and 25a also have outlet ports 30 and 30a therein in communication with the hollow interior portions 26 and 26a adapted to be aligned with vertically disposed passageways 31 and 31a which extend from the passageways 15 and 15a to the uppermost surface 4 of the bottom part 2 where they communicate with an annular channel 32 formed in the undersurface of the top part, the undersurface of the top part also having annular ridges 33 and 34 lying on opposite sides of the channel 32 and adapted to enter into sealing engagement with mating annular recesses 35 and 36 in the uppermost surface of the bottom part. The ridges and recesses thus form annular seals to prevent leakage of water or other fluid flowing through the annular channel 32. As will be evident from FIGURES 2 and 3, the annular channel 32 is in communication with one or more outlet passageways 37 formed in bosses 38 comprising an integral part of the top part 2. Two such outlet passageways have been shown in the embodiment illustrated, although it will be understood that normally only one of the outlets would be utilized, depending upon the positioning of the discharge spout relative to the valve mechanism.

Figure 6:
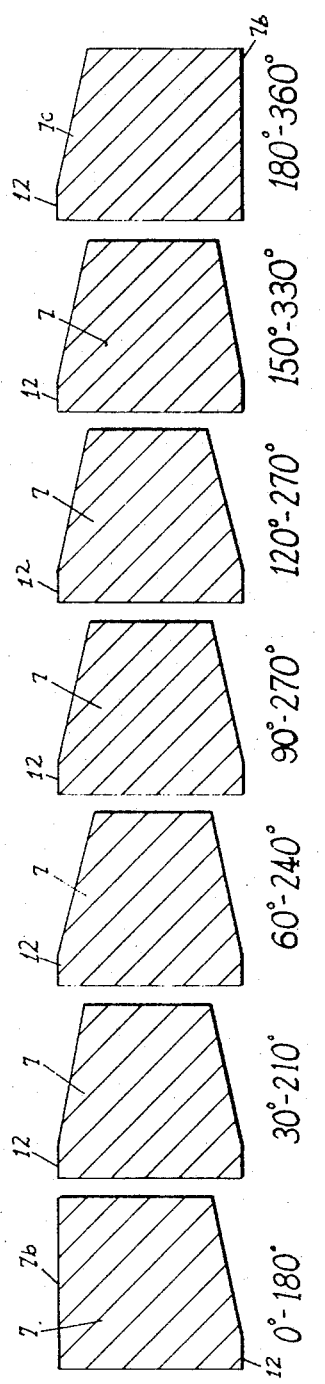
FIGURE 6 is a bottom plan view of the profile of the plunger actuating cam.
Figure 7:
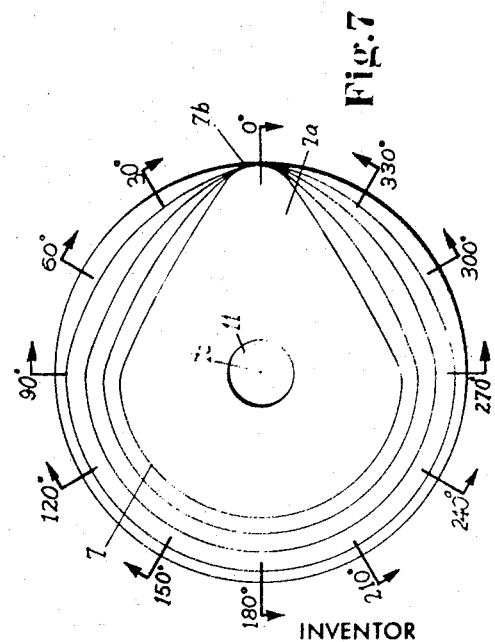
FIGURE 7 is a composite view illustrating the cross-sectional configuration of the actuating cam taken at 30° intervals about the vertical center line of the cam.

Referring now to FIGURES 6 and 7 of the drawings, it will be seen that the control cam 7 has a compound profile lying beneath the enlarged cylindrical body portion 12. The profile of the cam may be characterized as being of generally conical or tapered configuration but having a protrusion or nose portion 7a projecting outwardly from one side thereof, the protrusion defining a straight edge 7b, paralleling the axis of rotation 7c of the cam and of constant width throughout the depth of the cam, which width is equal to the radius of the cylindrical body portion 12 of the cam.

As will be clearly evident from FIGURES 1, 3 and 4, the cam may be moved axially and also rotated about its axis by means of the cam shaft 8 which, at its uppermost end, will be operatively connected to a valve actuating mechanism capable of imparting both axial and rotative movement to the cam shaft. Such actuating mechanism may be of the straight rotating lever type, wherein pivoting movement of the lever in a vertical direction results in axial movement of the cam shaft, whereas horizontal or swinging movement of the lever results in rotation of the cam shaft. Similar results are achieved with a lever and ball actuating mechanism wherein the lever arm incorporates a ball and socket connection, or by means of a control knob having a push-pull action to move the cam shaft axially, the control knob being rotatable to impart rotation to the cam.

In the operation of the valve assembly, the inlet ports will be closed to the flow of fluid therethrough by displacing the control cam 7 downwardly, thereby causing the inner ends of the actuating plungers 17 and 17a to be contacted by the cylindrical body portion 12 of the cam. Such movement causes the actuating plungers to be displaced outwardly, and in so doing the enlarged heads 19 and 19a of the plungers urge the faces 20 and 20a of the diaphragms into sealing contact with the marginal edges of the spacers surrounding the innermost ends of valve ports 27 and 27a. The inlet passageways 15 and 15a are thus closed to the flow of fluid therethrough and the valve is in its fully "off" position, and this is true irrespective of the rotational position of the nose portion 7a of the cam. Normally, however, the orientation of the control cam relative to the plungers 17 and 17a will be such that when the lever arm or control knob of the actuating mechanism is in a central or "neutral" position of rotation, the nose portion of the cam will lie equidistant between the plungers 17 and 17a, i.e., if the plungers are spaced apart by 180°, the nose portion of the cam will lie at an angle of 90° from each of the plungers.

When the cam is displaced vertically upwardly while the nose is in the "neutral" position, it will be evident that the inner ends of the plungers 17 and 17a will be freed to move inwardly along the inwardly and downwardly inclined conical body portion of the cam, as will be evident from the left-hand portion of FIGURE 1, thereby opening the adjoining passageways to the flow of fluid therethrough. The plungers 17 and 17a will be urged inwardly against the cam by reason of the pressure of the water seeking to displace the diaphragms and their coacting plungers inwardly and the volume of flow will be dependent upon the extent to which the cam is axially displaced, thereby controlling the volume of flow.

Figure 2:
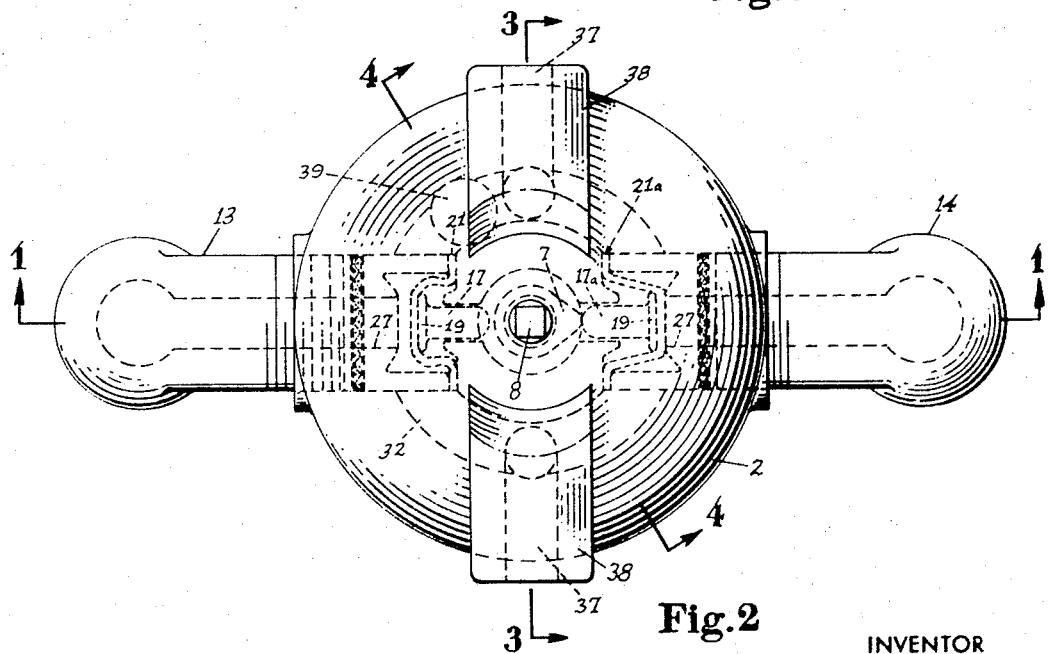
FIGURE 2 is a plan view thereof with internal parts shown in dotted lines.

It will be evident that upon inward displacement of the diaphragms, fluid may flow inwardly through passageways 15 and 15a into the hollow interior portions of the spacers, through the outlet ports 30 and 30a, the passageways 31 and 31a into the annular channel 32 in the top part, from whence the fluid is discharged through one of the outlet passageways 37. With the cam in the "neutral" position, equal quantities of fluid will be introduced through each of the passageways, and if the passageways are connected to sources of hot and cold water, an equal mixture of hot and cold water will result.

Where it is desired to close only one of the inlet passageways, the cam shaft 9 will be rotated to the position illustrated in FIGURES 1 and 2 so as to move the nose portion 7a in the direction of the inlet passageway to be closed. As the nose portion of the cam moves toward one of the plungers, such as the plunger 17a, it will be moved outwardly as its innermost end rides up onto the nose portion of the cam, culminating in the plunger being fully extended when its innermost end is contacted by the outermost edge of the nose portion which, as previously indicated, is of a width equal to the radius of the cylindrical body portion 12. Hence the plunger contacted by the nose will have extended the contracted diaphragm and pressed the face of the diaphragm into contact with the opposing wall of the spacer surrounding the valve port 27a which will be closed and sealed. At the same time, the opposing plunger will be in contact with a uniform conical segment of cam lying opposite the nose portion and it will remain in its previously established opened position. Thus, either hot or cold water alone may be dispensed.

Even with one of the inlet passageways closed, the volume of flow through the remaining passageway may be controlled by vertical movement of the cam. Since the nose of the cam is of equal width throughout the length of the cam, vertical displacement has no effect is raised or lowered, thereby increasing or decreasing the on the fully extended position of the plunger contacted thereby; whereas the opposing plunger will ride along flow opening in the other passageway.
the opposing tapered side edge of the cam as the cam It is also within the spirit and purpose of the invention, as illustrated in FIGURE 4, to provide an integral diverter conduit 39 for supplying a spray device or the like. The conduit 39 communicates with the annular channel 32 in the top part 2 but is of a larger flow area. Whenever the valve is opened so that water will flow into the channel 32, it will also flow into the diverter conduit 39 and the hose or the like which would be connected to the opposite end thereof. Discharge of water is, however, normally prevented by the valved spray head or the like on the opposite end of such hose. When the valve of the spray device is opened, the water flowing through the valve will seek the path of least resistance, which is through the diverter conduit 39 which is of larger flow area than the channel 32 and the outlet passageway 37. As will be understood by the skilled worker in the art, the faucet or other outlet to which the outlet passageway 37 is connected will be provided with a diverter valve which will close upon diversion of water through the diverter conduit, thereby directing the entire flow of water through the diverter conduit.

The valve assembly of the instant invention may be formed from any desired materials, although preferably it will be formed in its entirety from plastic, excepting for the resilient diaphragms. Thus, both the bottom and top parts of the valve body, the cam and associated cam shaft, and the plungers may be formed from plastic materials. Where this is done, the usual corrosion problems encountered with metallic fittings are eliminated, and the inherent lubricity of plastic provides for lubrication-free movement of the moving parts. As will be evident, the moving parts of the valve structure are sealed from exposure to water or other fluid flowing through the valve, and again the usual corrosion problems are avoided, as is the problem of the build-up of mineral deposits which might impede the proper operation of the valve. The use of packing glands or O-ring seals is eliminated insofar as the operating parts of the valve are concerned, particularly as to the moving parts, and hence wear problems are not encountered. Even as to the rubber diaphragms, they are not subject to the usual rotary motion encountered in seating a conventional faucet washer, and consequently they are not subject to scoring or wear in the usual sense. Nor are they subject to being stretched upon outward movement of the plungers. Rather, it is preferred that the diaphragms will normally seat against the valve ports 27 and 27a, with the pressure of the incoming water flexing or bowing the body walls of the diaphragms inwardly as the plungers are freed to move inwardly by the control cam. Ultimate fatigue or decay of the diaphragms would constitute the only reason for their replacement; and should this ever become necessary, the valve structure may be readily disassembled to replace the diaphragms.

Various modifications have already been suggested and others will undoubtedly occur to the skilled worker in the art upon reading the specification. For example, while it is preferred that the annular discharge passageway be formed in the undersurface of the top part 2, it should be readily apparent that it could be formed in the surface 4 of the bottom part. Similar considerations apply with respect to the annular projections and mating grooves which form seals for the aforementioned discharge channel.

The embodiments of the invention in which an exclusive property or privilege is claimed are defined as follows:

1. A valve structure comprising a valve body having a chamber therein, an inlet passageway in said body projecting inwardly from one side of said body to said chamber, said inlet passageway being adapted to be connected to a source of fluid under pressure, a resilient diaphragm closing said passageway intermediate its inner and outer ends, an axially movable plunger mounted in said passageway between said diaphragm and said chamber with the inner end of said plunger normally projecting into said chamber, a control cam in said chamber mounted for movement relative to said plunger, said cam contacting the inner end of said plunger and being configured so that movement thereof will effect axial movement of said plunger, a valve port in said inlet passageway facing the said diaphragm on the side thereof opposite said plunger, said diaphragm being displaceable outwardly by said plunger to a closed position in which the cam urged plunger causes the diaphragm to seat against and close said valve port, said diaphragm and said plunger being jointly displaceable inwardly by fluid pressure in said inlet passageway upon release of said plunger for inward movement, said diaphragm moving to an open position in which it lies in spaced relation to said valve port, thereby opening said inlet passageway to the flow of fluid therethrough, there being an outlet passageway in said valve body intersecting said inlet passageway intermediate said valve port and said diaphragm when the latter is in its open position, said resilient diaphragm having a generally conical body terminating at its smaller end in a flat face positioned to contact and seal said valve port when said diaphragm is extended by said plunger, said plunger having a head at its outermost end of a size to seat against the inner surface of said flat face and force said flat face in sealing contact with said valve port.

2. The valve structure claimed in claim 1 wherein said diaphragm terminates at its opposite end in an outwardly directed annular flange, wherein said inlet passageway has a shoulder therein against which said flange is seated, and wherein an annular spacer is fitted in said passageway and positioned to urge said flange into sealing contact with said shoulder.

3. The valve structure claimed in claim 2 wherein said spacer has a hollow interior portion of a size to freely receive the conical body and face of said diaphragm, wherein said valve port is formed in a wall surface of said spacer defining one end of the hollow interior portion thereof, and wherein the hollow interior of said spacer has an opening therein in communication with the outlet passageway in said valve body.

4. The valve structure claimed in claim 1 wherein said valve body has a bottom part and a top part having mating surfaces, wherein said inlet passageway and said chamber are formed in said bottom part, wherein said outlet passageway extends between said inlet passageway and the interface of said top and bottom parts, said outlet passageway opening into an annular channel formed in one of said parts at their interface, said annular channel being connected to an outlet port in said top part.

5. The valve structure claimed in claim 4 wherein a diverter conduit is formed in said valve body in communication with said annular channel, said diverter conduit having a larger cross-sectional area than said channel.

6. The valve structure claimed in claim 5 wherein the mating surfaces of said top and bottom parts having mating annular projections and grooves lying on opposite sides of said annular channel to form fluid tight seals for said channel.

7. The structure claimed in claim 1 wherein said valve body has a second inlet passageway therein projecting inwardly to said chamber from the side of said body opposite said first named inlet passageway, said second inlet passageway having a diaphragm, a plunger, a valve port and an outlet passageway therein corresponding to those associated with said first passageway, and wherein said control cam is configured to jointly and severally open and close said inlet passageways to the flow of fluid therethrough.

8. The valve structure claimed in claim 7 wherein said control cam is mounted on a shaft for both axially and rotational movement, said control cam having a generally conical body portion terminating at its base end in a cylindrical body part of a size such that when the cam is displaced axially so as to bring said cylindrical body part into contact with the inner ends of said plungers, said plungers will be moved outwardly to extend said diaphragms and close said valve port to the flow of fluid therethrough, said conical body portion also having a projection along one side thereof extending the full length of said conical body portion, said projection being of constant width throughout its length, which width is substantially equal to the radius of said cylindrical body part.

9. The valve structure claimed in claim 8 wherein a centrally disposed guide pin projects upwardly from the bottom of said chamber, and wherein said control cam has an elongated bore therein in which said guide pin is slidably received.

References Cited

UNITED STATES PATENTS

| | | | |
|---|---|---|---|
| 787,449 | 4/1905 | Idris et al. | 251—331 |
| 1,114,019 | 10/1914 | Morris | 251—263 |
| 1,125,856 | 1/1915 | Mara | 251—331 |
| 3,207,183 | 9/1965 | Stuhl | 251—257 |
| 3,297,051 | 1/1967 | Church et al. | 137—625.17 |

FOREIGN PATENTS 1,015,290  9/1957  Germany.

M. CARY NELSON, Primary Examiner

WILLIAM R. CLINE, Assistant Examiner

U.S. Cl. X.R.

137—607; 251—251, 331